United States Patent [19]
Provenzano et al.

[11] Patent Number: 6,007,926
[45] Date of Patent: Dec. 28, 1999

[54] PHASE STABLIZATION OF ZIRCONIA

[75] Inventors: Virgil Provenzano, Bethesda, Md.; Ronald L. Holtz; David Lewis, both of Alexandria, Va.

[73] Assignee: The United States of America as represented by the Secretary of the Navy, Washington, D.C.

[21] Appl. No.: 08/791,292

[22] Filed: Jan. 30, 1997

[51] Int. Cl.[6] ............................... B32B 15/04; F01D 5/28
[52] U.S. Cl. ..................... 428/633; 428/472; 416/241 B
[58] Field of Search .................................... 428/633, 678, 428/472, 623; 416/241 B

[56] References Cited

U.S. PATENT DOCUMENTS

| 4,639,399 | 1/1987 | Aprigliano | 428/623 |
| 4,845,056 | 7/1989 | Yamanis | 501/12 |
| 5,059,095 | 10/1991 | Kushner et al. | 416/241 B |
| 5,147,731 | 9/1992 | Gilmore et al. | 428/633 |

*Primary Examiner*—John J. Zimmerman
*Attorney, Agent, or Firm*—Barry A. Edelberg; George A. Kap

[57] ABSTRACT

Stabilized zirconia containing sintered particles of alumina and zirconia in tetragonal phase at temperatures below about 1150° C. is prepared by mixing alumina particles of less than 30 nanometers with zirconia particles of less than 30 nanometers in presence of a liquid to form a suspension, drying the suspension at a temperature up to about 600° C. to remove the liquid and products thereof to form a dried suspension composed of agglomerated alumina and zirconia particles, sintering the dried suspension to fuse the particles, and cooling the sintered dried suspension to an ambient temperature to produce free-standing bodies or coatings on substrates.

4 Claims, No Drawings

PHASE STABLIZATION OF ZIRCONIA

BACKGROUND OF INVENTION

1. Field of Invention:

This invention pertains generally to the field of stabilized zirconia, and more specifically to the field of thermally stabilized zirconia.

2. Description of Prior Art:

Thermal barrier coatings provide thermal insulation to gas turbine engine hot-end components, such as blades and vanes. The application of ceramic coatings for thermal insulation significantly increases the efficiency and the power of the engine by lowering the temperature of the metal components while reducing engine fabrication costs by avoiding complex cooling schemes. Zirconia is the ceramic material that has been studied most extensively for thermal barrier coating applications. The properties of zirconia that are attractive for thermal barrier coatings include high melting temperature, low thermal conductivity, and a relatively high thermal coefficient of expansion to match expansion of the underlying superalloy substrate, if one is present. However, pure zirconia has a very serious drawback related to its high temperature phase stability. Depending on the temperature, zirconia has three distinct crystal structures. The cubic phase is stable at temperatures above about 2370° C. A tetragonal phase is stable between about 1150° C. and 2370° C. Below about 1150° C., the tetragonal phase transforms to a monoclinic phase through a martensitic transformation. This transformation is accompanied by a 3–6% volume expansion and the generation of shear strains due to distortion of the tetragonal crystal. The tetragonal-to-monoclinic transformation is troublesome for coating applications since it leads to coating disintegration and failure after only a few operating cycles.

Different approaches have been tried to stabilize the tetragonal phase zirconia. The most common and accepted method for phase stabilization is alloying zirconia ($ZrO_2$) with either yttria ($Y_2O_3$), ceria ($CeO_2$) or magnesia ($MgO$). At present time, yttria-stabilized zirconia is being evaluated for thermal barrier coating applications in gas turbine engine airfoils and other high temperature gas engines. The zirconia-based thermal barrier coating system used in turbine engine components is of a multilayer construction, with an MCrAlY (M=Ni, Co, or Fe) inner coating, known as the bond coat, on a superalloy substrate and yttria-stabilized zirconia outer coating. An alumina ($Al_2O_3$) scale forms at the interface between the MCrAlY and the yttria-stabilized zirconia layers during normal engine operation.

Failure of the thermal barrier system, often after only a few operating cycles, is often caused by cracks that develop between either the alumina scale and the yttria-stabilized zirconia coating or the scale and the bond coat. In addition to this mechanical failure mechanism, yttria is known to be subject to severe hot corrosion in the presence of salt, such as in a marine environment, and by sulfur and vanadium, which are common fuel contaminants. This hot corrosion process, leading to leaching of the yttria out of the yttria stabilized zirconia layer, effectively destroys the phase stabilization action of yttria.

U.S. Pat. No. 5,147,731 discloses a corrosion resistant structure of an outer ceramic layer disposed over a base alloy of MCrAlY when the outer ceramic layer is alumina stabilized zirconia consisting of 40–50 weight percent zirconium, 32–36% oxygen, and 18–24% aluminum.

SUMMARY OF INVENTION

An object of the present invention is to supress the phase transformation and thus eliminate or reduce the volume change during phase transformation of zirconia between tetragonal and monoclinic phases.

Another object of the invention is to alleviate hot corrosion of a stabilized zirconia in a high temperature environment containing salt, sulfur and other components.

Another object of the invention is a corrosion resistant structure resistant to oxidation thus having an extended life.

These and other objects of this invention are accomplished by a structure having an alumina stabilized zirconia coating thereon wherein the zirconia is stabilized in the tetragonal phase, stabilization being accomplished by mixing nanophase zirconia and alumina powders having particle size below 100 nanometers and heat treating the mixture at a temperature that corresponds to the tetragonal phase of zirconia.

DESCRIPTION OF PREFERRED EMBODIMENTS

This invention pertains to stabilized tetragonal zirconia and to a process for making same. The present invention depends on alumina and zirconia grain size, on geometric constraint and on grain boundary pinning for stabilizing zirconia in the tetragonal phase. Geometric constraint is provided by combining zirconia with another material that is insoluble in zirconia and vice versa and has high elastic modulus.

In preparing stabilized zirconia pursuant to this disclosure, an insoluble alumina powder is mixed with zirconia powder using a liquid dispersant, such as water or propanol or another alcohol. Amount of the dispersant is not critical. What results is a suspension of alumina particles and zirconia particles. On the basis of alumina and zirconia, amount of alumina can be in the range of 1–65, preferably 30–50, and more preferably 10–20 volume percent, with remainder to 100%, of course, being zirconia. Average particle size of each alumina and zirconia is below 30, preferably below 10 and especially in the range of 1–10 nanometers. Relative size of alumina to zirconia is typically in the range of 1:10 to 1:1, more typically about 1:1.

Generally speaking, in stabilizing zirconia pursuant to this invention, volume fraction of alumina used varies inversely with its particle size. This means that a smaller fraction of alumina powder can be used with smaller powder particles. The dispersants are removed or volatilized from the suspension by heat treatment which also includes calcination at higher temperature. The higher temperature is used to remove products of the dispersants which may convert to various forms, including hydroxides. This heat treatment step is accomplished typically at about 20–600° C. in about 0.5–150 hours, more typically at about 600° C. in about 8 hours. This heat treatment can typically be accomplished by placing the suspension in a metal or ceramic boat and placing the boat in a drying oven or a furnace.

When mixing the alumina and zirconia powders, it is not necessary to have zirconia in any particular phase to achieve phase stabilization, as disclosed herein. When mixed with alumina powder, zirconia powder can be in cubic, tetragonal or monoclinic phases, although typically, zirconia at room temperature is in the monoclinic form.

If stabilized zirconia is to be made into an article rather than used as a coating, the dried suspension is typically broken up into powder or smaller agglomerates, compacted into a desired form, and sintered. Compaction is carried out at a sufficient pressure to form the desired, free-standing form. Using alumina and zirconia powder mix, typically, compaction pressure is about 50–150 kpsi, and more typically, about 60–120 kpsi.

The sintering step bonds the grain surfaces together and provides for diffusion of components between unit cells and between individual grains. Bonding of the grains provides geometric constraint or grain bondary pinning which leads to stabilization of zirconia in the tetragonal phase. Sintering is typically conducted at about 1000–1700° C. in about 0.5–10 hours, more typically at about 1100–1400° C. in about 1–5 hours. Generally, the sintering temperature is in the tetragonal phase range for zirconia.

If it is desired to provide a protective coating of stabilized zirconia for use in a high temperature and possibly corrosive environment, then the suspension is made so that it can be applied over a substrate. The suspension in such a case can be applied by any means, typically a spray gun, such as a typical paint spray gun. So that the suspension can pass through the fine nozzle of a spray gun, it is made with low solids content, on the order of 90% liquid vehicle.

The suspension is typically applied to a MCrAlY bond coat where M is cobalt, nickel, or iron. The bond coat is typically 0.08–0.2 mm thick and comprises on a weight basis, 15–35% chromium, 5–13% alumina 0–1% yttrium, and the balance cobalt, nickel or iron. The bond coat protects and is disposed over a superalloy substrate, such as nickel or a cobalt superalloy.

The initial heat treatment to drive off the dispersant and the sintering step can be combined by placing the suspension coating disposed on a MCrAlY bond coat in a furnace and raising temperature to drive off the solvent and then sinter and fuse the alumina and zirconia powder particles. The resulting coating is alumina/zirconia which, together with the MCrAlY bond coat, protects the underlying superalloy substrates from the high temperatures. Furthermore, since the alumina/zirconia coating is devoid of yttria, the coating also provides protection from corrosion which typically takes place at a high temperature in a marine environment containing corrosive components, such as vanadium salts and sulfur.

Stabilization of zirconia, as disclosed herein, is achieved by cooperating effects of size and geometric constraint. It is known that the tetragonal to monoclinic phase transformation of unconstrained zirconia does not take place if grain or particle size of zirconia is below about 17 nanometers. The problem with this fact is that upon even a mild heat treatment, the grain size can increase several fold in size and heat treatment at about 1200° C., can increase the orginal grain size hundreds of times. The presence of alumina geometrically constrains, or grain boundary pins, the expansion of a zirconia grain thus minimizing growth of zirconia grains during high temperature service.

The stabilized zirconia coating of this invention can also be applied to a substrate by other means such as chemical vapor deposition, physical vapor deposition or thermal spraying. These techniques are well known to persons skilled in the art.

The stabilized zirconia coating in a thermal barrier coating system should be as thin as possible since a thin coating is less prone to cracking than thicker coatings and it is cheaper since less material is used. However, a thick coating, although more expensive, provides more thermal and chemical protection to the underlying substrate and allows operation at a higher temperature since the underlying substrate experiences a lower temperature. Although thermal conductivity of alumina is many times that of zirconia, it should slow down oxidation because oxygen goes through alumina much more slowly than it does through zirconia. Balancing these prerogatives, thickness of the stabilized zirconia coating of this invention is typically about the same as the more common prior art stabilized zirconia coatings where zirconia is stabilized with yttria or ceria. In terms of specific parameters, thickness of the stabilized zirconia coatings of this invention is typically up to about 300 microns, more typically about 10–100 microns.

SEM micrographs and x-ray diffraction spectra of alumina-zirconia can be used to monitor performance characteristics of suitable stabilized zirconia of this invention. Suitable stabilized zirconia of this invention is tetragonal phase at room temperature since it has very little grain growth and shows no microcracking in the grains.

The stabilized zirconia of this invention is particularly important for thermal barrier applications in the hot end components of turbine engines for aircraft, surface ships, submarines, and land-based power generating plants. However, the stabilized zirconia can be used in any freestanding form or as a coating application where high temperatures with or without corrosion environment, is encountered.

Having describe the invention, the following examples are given as particular embodiments thereof and demonstrate the practice and advantages thereof. It is understood that the examples are given by way of illustration and are not intended to limit the specification or the claims in any manner.

EXAMPLE 1

This example demonstrates an attempt to stabilize zirconia against phase transformation that generally takes place between tetragonal and monoclinic phase which, in absence of stabilization, is accompanied by a 3–6% volume change.

The alumina and zirconia powders were in 20% water suspensions, i.e., 20 grams powder per 100 grams water, and powder particle size of alumina and zirconia powders was about 10 nanometers for each. The zirconia suspension contained a small amount of acetic acid to prevent clumping or agglomeration of the powder particles.

Pursuant to the procedure of the preparation process 60 ml of alumina suspension and 90 ml of zirconia suspension were placed in about a 100 ml empty bottle and the bottle was shaken overnight on a mechanical shaker. The suspensions were mixed in a ratio to provide 10% by volume of alumina. The suspension mix was then dried in air for 6 days and then at 600 degrees C. overnight to make certain that all traces of moisture and acetic acid were removed. Following drying, what was formed was an agglomerated mass of alumina and zirconia particles which could easily be broken and reduced to powder by application of manual pressure. Drying was followed by heat treatment at 1200 degrees C., a temperature at which zirconia is in the tetragonal phase. The heat treatment at 1200 degrees C. sintered or fused the alumina and zirconia particles into a hard, coherent mass which could not be broken-up by application of manual pressure. This sample was finally cooled to the ambient temperature.

This 10% alumina sample had significant grain growth and there were microcracks in the grains. The x-ray diffraction spectra of this sample showed that zirconia had transformed from tetragonal to monoclinic phase upon cooling.

Results for this sample indicated that 10% by volume of alumina was insufficient to stabilize zirconia against the volume change that takes place when phase transformation takes place between tetragonal and monoclinic phases.

EXAMPLE 2

Following the procedure outlined in Ex. 1, above, with the exception of preparing a suspension mix by mixing 50 ml of alumina suspension and 50 ml zirconia suspension, a cooled sintered coherent mass was prepared. This 50% alumina sample had very little grain growth and no microcracking. Its x-ray diffraction spectra showed that zirconia had retained the tetragonal phase on cooling.

With 40% by volume of alumina with particle size of about 10 nanometers, majority of the zirconia particles were in the tetragonal phase and a minority of the particles were in the monoclinic phase. With 30% by volume alumina with particle of about 10 nanometers, majority of the zirconia particles were in the monoclinic phase and minority of the particles were in the tetragonal phase. Proportion of zirconia particles in the tetragonal phase can be increased by using a smaller zirconia powder particles.

While presently preferred embodiments have been shown of the invention disclosed herein, persons skilled in this art will readily appreciate that various additional changes and modifications may be made without departing from he spirit of the invention as defined and differentiated by the following claims.

What is claimed is:

1. An article comprising a substrate and an outer ceramic layer disposed on said substrate, said layer comprising alumina stabilized zirconia wherein said zirconia is in a tetragonal phase at temperatures below 1150° C.; wherein said layer is a sintered mixture of said alumina particles and said zirconia particles; wherein average particle size of said alumina and said zirconia is about 10 nanometers; and wherein volume percent of said alumina is 40–50%, based on the total volume of said alumina and said zirconia.

2. The article of claim 1 wherein thickness of said outer layer is up to about 300 microns.

3. A corrosion resistant structure comprising an outer ceramic layer resistant to oxidation at high temperatures disposed over and in physical contact with a bond coat of MCrAlY where M is selected from the group consisting of cobalt, nickel, iron, and mixtures thereof; said outer layer comprises alumina stabilized zirconia consisting of 40–50 volume percent alumina particles of about 10 nanometer average particle size and to 100 volume percent of zirconia particles in tetragonal phase at temperatures below about 1150° C. of about 10 nanometer average particle size; and wherein said alumina and said zirconia particles are sintered.

4. The structure of claim 3 including a superalloy disposed below and adhering to said bond coat, said outer layer and said bond coat constituting a thermal barrier coat that has about the same coefficient of expansion as said superalloy.

* * * * *